United States Patent [19]

Zengel et al.

[11] 3,860,641

[45] Jan. 14, 1975

[54] PROCESS FOR THE PRODUCTION OF THIOGLYCOLIC ACID, BETA-MERCAPTOPROPIONIC ACID OR SALTS THEREOF

[75] Inventors: Hans Georg Zengel, Kleinwallstadt; Manfred Bergfeld, Erlenbach, both of Germany

[73] Assignee: Akzo N.V., Arnhem, Netherlands

[22] Filed: Oct. 9, 1973

[21] Appl. No.: 404,483

[30] Foreign Application Priority Data

Oct. 21, 1972 Germany............................ 2251717

[52] U.S. Cl. ............................................. 260/526 S
[51] Int. Cl. .......................................... C07c 149/06
[58] Field of Search ................................ 260/526 S

[56] References Cited
UNITED STATES PATENTS

| | | | |
|---|---|---|---|
| 2,449,989 | 9/1948 | Gresham.......................... | 260/526 S |
| 2,945,880 | 7/1960 | DePree et al.................... | 260/526 S |
| 3,029,279 | 4/1962 | Kondo et al..................... | 260/526 S |
| 3,517,058 | 6/1970 | Thoma et al. .................. | 260/526 S |

FOREIGN PATENTS OR APPLICATIONS 670,702   4/1952   Great Britain................... 260/526 S Primary Examiner—Vivian Garner
Attorney, Agent, or Firm—Johnston, Keil, Thompson & Shurtleff

[57] ABSTRACT

A process for producing thioglycolic acid, $\beta$-mercapto-propionic acid or their alkali or alkaline earth metal salts by heating a hydrogen sulfide such as sodium or potassium hydrogen sulfide with a xanthogenic acid ester such as $CH_3CH_2O$—$CS$—$S(CH_2)_n$—$COOH$ or its sodium or potassium salt where $n$ is an integer of 1 or 2. The initial salt of the mercaptocarboxylic acid product is readily converted into the free acid while advantageously recycling the filtrate containing a salt of xanthogenic acid for reaction with a monohaloacetic acid or a $\beta$-monohalopropionic acid to reform the xanthogenic acid ester reactant. Both thioglycolic acid and $\beta$-mercaptopropionic acid or their salts are valuable products widely used in the chemical industries.

12 Claims, No Drawings

PROCESS FOR THE PRODUCTION OF THIOGLYCOLIC ACID, BETA-MERCAPTOPROPIONIC ACID OR SALTS THEREOF

The present invention relates broadly to the commercial production of thioglycolic acid (mercaptoacetic acid) and β-mercaptopropionic acid or their corresponding salts as preferably obtained from monochloro-acetic acid or β-chloro-propionic acid or similar initial raw materials.

Various syntheses of thioglycolic acid are known from literature sources. It will be noted that thioglycolic acid was obtained for the first time by Carius in his reaction of monochloroacetic acid and potassium hydrogen sulfide [Ann. (1,862), 124,43]according to the equation:

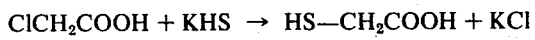

Burgotti produced the thioglycolic acid in a two stage synthesis by reaction of monochloracetic acid with sodium thiosulfate and finally hydrolysing the resulting Bunte salt (Gaz. Chim, ital. 1,892, 221, 422). This synthesis can be adopted for the technical production of thioglycolic acid (U.S. Pat. Nos. 2,413,361 and 2,594,030 and British Pat. No. 624,568). According to a synthesis described for the first time by Friedlander, chloroacetic acid or its salt is reacted with alkali polysulfides, the resulting dithioglycolic acid then being reduced with zinc and a mineral acid to the thioglycolic acid (German Pat. No. 180,875).

One can also obtain thioglycolic acid by hydrolysis of 2-imino-thiazolidone, which is easily accessible by reaction of monochloroacetic acid and thiourea (Japanese Pat. No. 3 158/52. Furthermore, it is possible to synthesize thioglycolic acid from sodium monochloroacetate and sodium trithiocarbonate (Belgian Pat. No. 668,463) as well as from sodium acetate and sulfur (U.S. Pat. No. 2,945,880).

It is further known according to the process disclosed by Biilman, Ann. 339 (1,905), 351, and Ann. 348 (1,906), 120, that thioglycolic acid can be prepared by splitting ethyl xanthogenic acetic acid by means of ammonia. As a by-product there arises in this case ethyl xanthogenic acid amide. Although this process does give good yields, it is disadvantageous insofar as both reaction products must be separated from each other in a costly extraction process. Over and beyond this, the process is also uneconomical because the ethyl xanthogenic acid amide by-product has no further utility as a commerical substance and must therefore be discarded.

IF the splitting of the ethyl xanthogenic acid is carried out with amines, then a substituted thiourethane is obtained as by-product [E. Mameti, Ann. Chim. (Rom) 45, 211–28 (1956); compare C. A. 51 (1957), 402g]. In splitting the ethyl xanthogenic acetic acid with a acoholic potash, there is obtained potassium ethyl thiocarbonate (Bender'sches salt) in addition to the potassium salt of thioglycolic acid. If the alkali metal salt of thioglycolic acid is treated wth boiling water or with an alkaline solution, there is obtained besides the alkali salt of the ethyl xanthogenic acid some additional products of the splitting, especially ethanol, carbon dioxide and hydrogen sulfide. The ethyl xanthogenic propionic acid decomposes in the same manner [B. Holmberg, J. prakt. Chem. (2) 71 (1905), 264]. When splitting such xanthogenic acid esters by means of acids, one obtains the corresponding mercaptans and the corresponding hydroxy compounds as well as carbonyl sulfide (COS), also identified as carbon oxysulfide [Houben-Weyl, Georg-Thieme-Verlag, Stuttgart, Vol. IX, page 318]. The reactions which involve a splitting of ethyl xanthogenic acids are not suitable for a techinical synthesis of mercaptocarboxylic acids because, as in the case of splitting with ammonia, by-products are formed in large amounts with little or no commerical value.

Of all the above noted syntheses, only the original synthesis of Carius is suitable as the basis for a commerical production of thioglycolic acid. In this process according to the Carius synthesis, there is always obtained a mixture of thioglycolic acid and thiodiglycolic acid. According to Klason and Carlson, the yield of thioglycolic acid can be increased if one proceeds from a weak solution of monochloroacetic acid and potassium hydrogen sulfide and introduces potassium hydrogen sulfide in a large molar excess of 100 percent [Ber. 39 (1,906), 732–8]. The authors in this reference claim to have obtained a 99.6 percent yield with an initial 15 percent by weight monochloroacetic acid and potassium hydrogen sulfide solution. In another publication concerning thioglycolic acid [Schütz, Angew. Chem. 46 (1933), pages 780-1], it is maintained that this result was only capable of being produced if the hydrogen sulfide is prepared within a short time before it is needed. Later work by Vögler and Mulvaney has shown however that the high yields indicated by Schütz are not capable of being reproduced [Vögler, Seifen-Öle-Fette-wachse, Nr. 9/1951, pages 203–6; Mulvaney, Pro. Scientific Sect. Toil Goods Ass., Inc., No. 5 of May 17, 1946].

The thioglycolic acid sythesis according to Klason and Carlson is best carried out technically if one proceeds from the alkali salt of monochloroacetic acid rather than from the free acid itself. According to this variation, by use of at most a 15% NaHS solution and at most a 20 percent monochloroacetic acid solution corresponding to a monochloroacetic acid concentration in water of 4.5 mol percent), there is achieved a reaction with a conversion up to a maximum of 95 percent and a yield of vacuum-distilled thioglycolic acid of 80 percent. By increasing the concentration about 5 or 10 percent, i.e., corresponding to a monochloroacetic acid concentration in water of approximately 6.0 or 7.5 mol percent, the yield fell about 10 or 20 percent (Vögler, supra, page 204).

From the Japanese patent application No. 68 17,564 (compare Chem. Abstracts 70 (1969) 157, 163e), a process technique is known in which an aqueous potassium hydrogen sulfide solution saturated with hydrogen sulfide is reacted with an aqueous solution of potassium monochloroacetate at 90°C. under a nitrogen atmosphere of 7 atmospheres. In this way, it is intended to achieve a practically quantitative yield, but the process is however unsuitable for the commerical synthesis of thioglycolic acid because it requires the more expensive potassium compounds. By substituting the corresponding sodium compounds, there is obtained under the same conditions a crude product in a yield of only about 65 percent of theory.

For the industrial production of thioglycolic acid, it is thus recognized that from an economical viewpoint, only those processes on the basis of sodium hydroxide may come into consideration, i.e., such processes which proceed from caustic soda solutions and hydrogen sulfide or sodium hydrogen sulfide and the monochloroacetic acid or its sodium salt. In these processes, there exists as yet however the alternatives of either working with very low concentrations of the reaction solution while obtaining high yields or working with higher concentrated solutions but then accepting poor yields. In both cases, the space-time yield or total daily production on a commercial basis is not satisfactory.

For the production of β-mercaptopropionic acid, it is already known that β-iodopropionic acid may be reacted with potassium hydrogen sulfide. As yet, however, this does not yield a pure β-mercaptopropionic acid. In order to obtain the pure product, it is recommended that the crude product obtained in the reaction of β-iodopropionic acid be oxidized by means of iron chloride to the β-dipropionic acid disulfide and then this in turn be reduced to the β-mercaptopropionic acid [J. M. Loven, Journ. prakt. Chem. (2) 29 (1884), 376]. This process is very complicated and botheresome so that it cannot be considered suitable for the commercial production of β-mercaptopropionic acid.

It is further known to react β-iodopropionic acid at first with potassium xanthogenate to form the β-xanthogenic propionic acid [E. Biilman, Ann. 339 (1905), 363] and then to subject the intermediate product to a treatment with an alcoholic ammoniac solution. Herewith, the βacid accrues in a yield of only about 57 percent of theory, together with xanthogenic acid amide and β-dipropionic acid amide as by-products. The yield can be raised to about 79 percent of theory if the acid mixture, after separation of the xanthogenic acid amide, is subjected to a reduction and in this manner the β-dipropionic acid sulfide likewise converted into β-mercaptopropionic acid [E. Biilman, Ann. 348 (1906), 120].

Moreover, one can also proceed from propiolactone to produce β-mercaptoproponic acid. According to the process disclosed in U.S. Pat. No. 2,449,989, an aqueous or alcoholic solution β-propiolactone is introduced into an aqueous or alcoholic solution of a hydrogen sulfide, e.g., sodium hydrogen sulfide. By using an excess of the hydrogen sulfide reactant and by maintaining reaction temperatures in the range of −25° to −10°C., the yield of β-mercaptopropionic acid amounts to 87.4 percent of theory together with a yield of β-dipropionic acid sulfide of 7.3 percent of theory. According to the process of U.S. Pat No. 2,474,838, β-propiolactone is first reacted with thiourea to form S-β-carboxyethyl isothiourea which is then converted into the sodium salt by treatment with sodium hydroxide at a elevated temperature, followed by acidification of the reaction mixture to form the free acid. Both the formation and the splitting of the S-β-carboxyethyl isothiourea proceeds with quantitative yields.

Acrylonitrile is also an initial material suitable for the synthesis of β-mercaptopropionic acid. According to the process of U.S. Pat. No. 3,029,279, acrylonitrile is converted quantitatively at temperatures of 70°–115°C. in concentrated hydrochloric acid into S- -carboxyethyl isothiourea, which is transformed in the previously described manner into the β-mercaptopropionic acid [compare also Japanese patent application No. 2,913(1960); C. A., Vol. 54 (1960), 2881c]. According to the process of U.S. Pat. No. 3,069,472, one obtains β-mercaptopropionic acid in a 71.4 percent yield if tert. tert-dodecylmercaptan is added in small increments, e.g., dropwise, to acrylonitrile in the presence of sodium methylate at about 35°C, and the resulting reaction mixture is then treated with concentrated hydrochloric acid. From U.S. Pat. No. 3,280,163, it is known to transform acrylonitrile in the presence of small amounts of sulfur and an organic base, e.g., 2-methyl-5-ethyl-pyridine, into β-mercaptopropionitrile and to hydrolyze this with concentrated hydrochloric acid into the β-mercaptopropionic acid. The formation of the nitrile intermediate occurs at best with an approximately 67 percent yield and the hydrolysis results in a yield of about 65 percent. Moreover, as disclosed in Japanese Pat. application No. 7270 (1960) [compare C.A., Vol. 55 (1961), 6381], it is also known to react acrylonitrile in aqueous sodium hydrogen carbonate solution with a solution of sodium sulfide and sulfur. The dithiopropionitrile resulting from this reaction is then hydrolyzed and reduced in one stage by treatment with zinc and hydrochloric acid so as to form the β-mercaptopropionic acid.

In place of acrylonitrile, one can also make use of acrylic acid for the production of β-mercaptopropionic acid. According to the process disclosed by R. Dahlbom, Acta Chem. Scand. 5 (1951), 690, hydrogen sulfide in a solution of acrylic acid is introduced at −20°C. into diethylamine and methanol. The reaction mixture is then heated in a closed vessel for several hours at 70°C. The yield of β-mercaptopropionic acid amounts to only about 50 percent of theory. According to an improvement of this process set forth in British Pat. No. 1,150,720, one obtains yields of the β-mercaptopropionic acid of over 90 percent of theory if the acrylic acid in the presence of an organic base, e.g., triethylamine, is brought into reaction with a liquid hydrogen sulfide.

The known processes for producing the β-mercaptopropionic acid, as described above, generally suffer from at least one serious disadvantage, e.g., either the necessary initial reactants are too costly or difficult to obtain or else the yields of the product are unsatisfactory Only thioglycolic acid has been successfully produced on a commercial scale at reasonable expense and in good quality, and the original Carius process has appeared to be the only available technique for a large scale production of such mercaptoalkanoic acids.

It is an object of the present invention to provide a process for the production of thioglycolic acid or β-mercaptopropionic acid, beginning with readily available initial materials and obtaining the desired products in very high yields. Another object of the invention is to provide such a process in which only a single by-product is formed in the main reaction which may then be recycled and reused in this reaction after suitable reaction with a precursor reactant. This overall two-stage reaction is of particular value for commercial purposes. Other objects and advantages of the invention will become more apparent upon consideration of the following detailed specification.

In accordance wth the invention, it has now been discovered that one can achieve a particularly, quantitative yield of thioglycolic acid and also very high yields of β-mercaptopropionic acid by means of a process wherein a hydrogen sulfide of the formula MHS, M being an alkali or alkaline earth metal, is reacted with a xanthogenic acid ester of the formula $$R'O-CS-S(CH_2)_n-COOM',$$

where R' is alkyl of 1 to 5 carbon atoms, preferably methyl and especially ethyl, n is an integer of 1 to 2 and M' is hydrogen or, more frequently, an alkali or alkaline earth metal, the reaction being carried out at a temperature of approximately 10° to 100°C. in a lower alkanol as the reaction medium.

In a highly successful commerical production of each of these mercaptoalkanoic acids, one first obtains the alkali or alkaline earth metal salt of the thioglycolic acid or the β-mercaptopropionic acid by filtering off this salt as a first reaction product which is then preferably directly converted into the free acid, e.g., by reaction with hydrogen chloride gas in a suitable solvent medium. The filtrate, which contains the alkali or alkaline earth metal salt of xanthogenic acid, e.g., sodium or potassium xanthaogenate, as a by-product is then recycled by reaction with the haloacid of the formula $$X-(CH_2)_n-COOH$$

where X is chlorine or bromine and n is again an integer of 1 or 2, thereby forming the corresponding xanthogenic acid ester for reuse in the main process as described above. This recycle is also accomplished with practically quantitative yields so that very little if any metal xanthogenate needs to be added to the overall reaction.

In the process of the invention, the xanthogenic acid ester reacts with the metal hydrogen sulfide to form the desired mercaptosubstituted acetic or propionic acid and also, as a by-product, an equimolar amount of the corresponding metal salt of xanthogenic acid, as illustrated by the following equation:

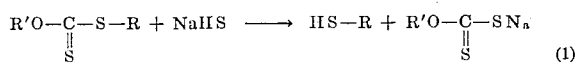  (1)

wherein R is —CH$_2$—COONa or —CH$_2$—CH$_2$—COONa; and R' is alkyl of 1 to 5 carbon atoms, preferably methyl or ethyl.

The salts and hydrogen sulfide of sodium are especially preferred in addition to potassium, these alkali metals providing the most economical process, particularly with reference to the consumption of the hydrogen sulfide compound in the reaction.

The xanthogenic acid ester reactant can be produced in known manner from the corresponding halogenated compounds by reaction with the metal salt of the xanthogenic acid according to the equation:

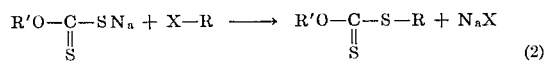  (2)

wherein X is chlorine or bromine. See, for example: Troger et al., Journ. prakt. Chemie (2) 70 (1904), page 422; B. Holberg, ibid. 71 (1905), page 264; Houben-weyl, Vol. IX, George-Thieme-Verlag, Stuttgart (1955), page 817.

The metal salts of xanthogenic acids are easily accessible for example by reaction of carbon disulfide with an alcohol, i.e., a lower alkanol, in the presence of an alkaline compound, i.e., a hydroxide such as sodium or potassium hydroxide, as illustrated by the following equation:

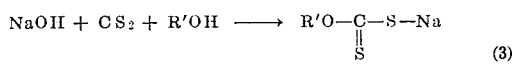  (3)

See, for example: Ullmanns Encylcopadie der technischen Chemie, 3rd Edition, Vol 18, page 718; and Canadian Pat. No. 862,137.

The salt of xanthogenic acid arising as the by-product according to equation (1) is recycled for the production of the xanthogenic acid ester according to equation (2). This means that the metal xanthogenate, e.g., sodium or potassium xanthogenate does not accrue as a by-product but is used over and over again to form the xanthogenic acid ester in the main or primary reaction. The secondary reaction of equation (2) proceeds in known manner so that an extensive explanation is not required here, the prior art being incorporated by reference as fully as if set forth in its entirety.

For the production of the xanthogenic acid ester required in the process of the invention, it is thus possible to react the corresponding halogen substituted alkanoic acid, i.e., monochloroacetic acid, monobromoacetic acid, β-chloropropionic acid or β-bromopropionic acid as represented by the formula $$X-CH_2-COOH \text{ or } X-CH_2-CH_2-COOH,$$

where X is chlorine or bromine, with the metal xanthogenate salt as set forth in equation 2. As suitable salts, there come into consideration the salts obtained from xanthogenic acids having the formula

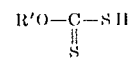

in which R' has the above meaning and the hydrogen atom is replaced by the metal M, also as defined above. For example, suitable salts are those of the methyl-, ethyl-, propyl-, isopropyl-, isobutyl and tert.-butyl-xanthogenic acids. Since the methyl- and ethyl-xanthogenic acid salts are simple to handle the very easily produced from carbon disulfide, an alkali hydroxide and either methanol or ethanol, respectively, it is especially preferred to use the methyl and ethyl esters of xanthogenic acid in the process of the invention. Especially preferred reactants are the esters referred to as the ethyl xanthogenic acetic acid of the formula

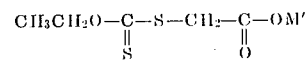

and the ethyl xanthogenic propionic acid of the formula

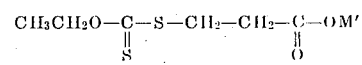

where M' has the same meaning as above, preferably hydrogen, sodium or potassium.

As the reaction medium, one can suitably use the lower alkanols of 1 to 5 carbon atoms, i.e., the straight chain and branched chain saturated alcohols such as methanol, ethanol, propanol, isopropanol, butanol, isobutanol, tert.-butanol and amyl alcohol. Preferably, these alkanols have the formula $$R' - OH$$

in which the R' radicals of both this alkanol and the xanthogenic acid ester reactant are identical to each other. In view of the preference noted above for the use of the methyl- and ethyl-xanthogenic acid ester, it will be apparent that it is also preferred to use the corresponding methanol or ethanol as the reaction medium.

In general, one preferably employs the reaction components in stoichiometric amounts. One of the two components may be used in excess, e.g., the hydrogen sulfide component, but without any special advantage.

The reaction of the xanthogenic acid ester with the alkali or akaline earth metal hydrogen sulfide occurs at temperatures in a range of approximately 10° to 100°C. Preferably, one works at the boiling temperature of the reaction medium. The total reaction period depends upon the temperature of the reaction and upon the particular xanthogenic acid ester reactant. In general, the reaction time is about 0.5 to 5 hours.

In carrying out the main process according to the invention, one can proceed for example by joining together solutions of the xanthogenic acid ester and the hydrogen sulfide in the lower alkanol being used as the reaction medium and then refluxing the resulting mixture. The alkali or alkaline earth metal hydrogen sulfide solution can also be produced by introducing a hydrogen sulfide itself ($H_2S$) into an alkanolic solution of the corresponding alkali or alkaline earth metal hydroxide or into the reaction medium containing the hydroxide. This preparation in situ of the hydrogen sulfide reactant represents an alternative but sometimes advantageous procedure in a large scale installation, depending upon the sources of raw materials most readily available in the chemical plant.

In the production of the mercaptocarboxylic acids in accordance wth the invention, i.e., the $\alpha$-mercaptoacetic acid as another name identifying thioglycolic acid and also the $\beta$-mercaptopropionic acid, it is desirable that the carboxylic acid group of the xanthogenic acid ester reactant be neutralized. This can be accomplished by converting the xanthogenic acid ester into the salt before the main reaction wtih the hydrogen sulfide (MHS) or by introducing the hydrogen sulfide solution with a corresponding excessive of the appropriate alkali or alkaline earth metal hydroxide.

By proceeding in this manner, it can be ensured that the mercaptocarboxylic acid product precipitates out as a salt from the reaction mixture. This precipitated product is then preferably filtered off, suspended in a solvent in which the alkali halide, i.e., the chloride or bromide, is insoluble and then directly transformed into the corresponding free mercaptocarboxylic acid. The alkali halide separated in this manner is easily filtered off. After distilling or evaporating the solvent, the free mercaptocarboxylic acid remains as a residue. The filtrate of the original reaction mixture, which contains a salt of the xanthogenic acid, can then be directly used for the preparation of the xanthogenic acid ester according to equation (2) above and thereby recycled to the main reaction represented by equation (1).

The known splitting reactions of xanthogenic acid derivatives with ammonia, amines or acids are not at all suitable for a technical or large scale commercial production of mercaptocarboxylic acids, especially because by-products of very little or no value are formed in such reactions. By comparison, the process of the present invention yields as the main by-product a xanthogenic acid derivative, i.e., the metal xanthogenate, which can be used again for the preparation of the xanthogenic acid ester used as the initial reactant in the main process. For commercial purposes, the process of the invention is therefore advantageously carried out in two stages with recirculation of the xanthogenic acid derivatives such that no sulfur-containing waste products are obtained. This represents a very substantial economical improvement as well as avoiding sulfur pollution problems. Moreover, the process of the invention also has the further advantage of a relatively simple working up of the reaction mixture into the desired mercaptocarboxylic acids.

The process of the invention is even further distinguished in comparison to known processes by the fact that no extraction procedure is required. Besides, the process of the invention may be carried out in a normally pressure-free manner, i.e., at substanially atmospheric pressure. Superatmospheric or subatmospheric pressures may be employed but are not essential.

The process of the invention is capable of being carried out in batch procedures, but it is preferably conducted in a semi-continuous to continuous manner whenever possible, e.g., by using cascade reactors, combining several reaction streams for common working up or for recycle purposes or similar procedures which do not interfere with reasonably high yields or an accumulation of sulfur-containing impurities.

Thioglycolic acid and $\beta$-mercaptopropionic acid are employed for example in the cosmetics industry for the production of cold permanent wave preparations. Thioglycolic acid is also used for the production of depilatories and for hair removal from the skin. Both of these compounds are also known as highly effective catalysts, for example in styrene/butadiene polymerization reactions, and they are also used in the form of their tin salts as stabilizers for polyvinylchloride.

The invention is illustrated by but not restricted to the following working exmples:

EXAMPLE 1 a. Preparing ethyl xanthogenic acetic acid
($CH_3CH_2O$—CS—S—$CH_2$—COOH)

Into a solution of 40 grams (1.0 mol) of sodium hydroxide in 500 ml. of ethanol, there were introduced dropwise at 10°C., within about 30 minutes, 76 grams (1.0 mol) of carbon disulfide and the solution then stirred for about 30 minutes. 94.5 grams (1.0 mol) of monochloroacetic acid were dissolved in 100 ml. water and while cooling at 20°–25°C. admixed with a solution of 40 grams (1.0 mol) of sodium hydroxide in 100 ml. of water. The two solutions were then joined together and stirred for about 3 hours at room temperature. Finally, the reaction mixture was gradually heated up to about 90°C. (bath temperature) such that approximately 90 to 94 percent of the ethanol distilled off. The residue was cooled to 20°C. and with further cooling admixed with a solution of 200 grams of a 20 percent by weight sulfuric acid. Herewith the ethyl xanthogenic acetic acid separated as an oil. It was extracted with chloroform, dried with sodium sulfate and precipitated with petroleum ether. The melting (or solidifying) point was 56°–59°C. The yield amounted to 180 grams (100 percent of theory).

b. Preparation of thioglycolic acid
(HS—$CH_2$—COOH)

180 grams (1.0 mol) of the ethyl xanthogenic acetic acid, as prepared under (a) above, was dissolved in 200 ml. of ethanol and then admixed with a solution of 40 grams (1.0 mol) of sodium hydroxide in 500 ml. of ethanol while cooling to maintain a temperature of less than 25°C. The resulting solution was added dropwise into a sodium hydrogen sulfide solution as obtained by the introduction of 36 grams (1.05 mol) of $H_2S$ into a solution of 40 grams (1.0 mol) sodium hydroxide in 500 ml. ethanol. After completing this addition and refluxing the reaction mixture at its boiling point for one hour, the resulting solution was filtered off under suction.

The sodium salt of thioglycolic acid obtained as the filter residue was washed with ethanol and dried. The yield amounted to 114 grams (100 percent of theory). This salt was thereafter suspended in ethanol, in which the thioglycolic acid is soluble but the NaCl is insoluble, and reacted with gaseous HCl to form the free thioglycolic acid and to then filter off this free acid product from the insoluble NaCl. The thioglycolic acid is recovered in pure form after separation of distilling off and/or evaporating the solvent.

The alcoholic filtrate contained a substantial amount of sodium ethyl xanthogenate and was reacted with the sodium salt of chloroacetic acid to directly form ethyl xanthogenic acetic acid which could again be used as a recycle initial reactant in the thioglycolic acid preparation.

EXAMPLE 2 a. Preparation of ethyl xanthogenic propionic acid
($CH_3CH_2O$—CS—S—$CH_2CH_2$—COOH)

A solution of 108.5 grams (1.0 mol) of β-chloropropionic acid in 450 ml. of water was admixed under cooling at temperatures of 20°–25°C. with a solution of 40 grams (1.0 mol) of sodium hydroxide. This solution was joined with the same sodium ethyl xanthogenate solution as described in Example 1 produced from 40 grams sodium hydroxide and 76 grams carbon disulfide. Thereby, the color of the solution changed from a weak pink to yellow.

The reaction mixture was then stirred at room temperature for 3 hours. Thereafter, the reaction mixture was heated and 90–95 percent of the solvent (water + ethanol) distilled off at normal pressure. The sump product was then cooled to 10–20°C. and carefully admixed with 250 ml. of a 25 percent sulfuric acid. Thereby, caution must be observed by cooling so that the temperature does not rise above 40°C. The ethyl xanthogenic propionic acid was thereby separated as a heavy yellow oil which dissociated from the aqueous phase. From this latter aqueous phase, the remaining traces of ethyl xanthogenic propionic acid were extracted with chloroform, the chloroform phase then dried and the ethyl xanthogenic propionic acid precipitated with petroleum ether. The total yield of ethyl xanthogenic propionic acid was 189 grams (97.5 percent of theory). In standing over night, the substance was completely crystallized with a melting point of 68°–71°C. (identified in literature as M.P. = 71°C.).

b. Preparation of β-mercaptopropionic acid.
(HS—$CH_2CH_2$—COOH)

189 grams (0.975 mol) of the ethyl xanthogenic propionic acid, as prepared in (a) of this example, was dissolved in 200 ml. of ethanol and then added dropwise to a suspension containing sodium hydrogen sulfide as obtained from 78 grams (1.85 mol) NaOH by introducing 34 grams (1.0 mol) $H_2S$ in 500 ml. ethanol. The resulting mixture was first stirred for 2 hours at room temperature and then refluxed at the boil for 1 hour. After cooling to 10°C. the precipitated sodium salt of β-mercaptopropionic acid was filtered off by suction and washed with cold ethanol and dried. The free acid was recovered in the same manner as in Example 1.

The alcoholic filtrate contained sodium xanthogenate and was converted directly by reaction with the sodium salt of β-chloropropionic acid to form ethyl xanthogenic propionic acid as the initial material for reuse in the main reaction.

EXAMPLE 3 a. Preparation of methyl xanthogenic acetic acid
($CH_3O$—CS—S—$CH_2$—COOH)

Into 175 ml. methanol there was dissolved 22.4 grams (0.4 mol) potassium hydroxide and after cooling to 10°C., 30.4 grams (0.4 mol) of carbon disulfide were added dropwise at this temperature over an interval of about 30 minutes. The resulting yellow solution was joined while cooling with a solution of 37.8 grams (0.4 mol) monochloroacetic acid in 40 ml. water, which had been neutralized with 22.4 grams (0.4 mol) potassium hydroxide in 40 ml. water at 20°–25°C. The mixture was then stirred at room temperature for 2 hours. Thereafter, approximately 90–95 percent of the methanol together with about 50 percent of the water was distilled off at normal pressure, and the residue reacted with 75 ml. of a 20 percent by weight sulfuric acid after cooling to 10°C. The methyl xanthogenic acetic acid separated therein as an oil and was recovered by means of a separatory funnel. From the aqueous phase, the residual small amount of methyl xanthogenic acetic acid was extracted by shaking with chloroform several times. From the collected organic phases, after being covered over with petroleum ether the methyl xanthogenic acetic acid separated out in the form of long colorless needles with a melting point of 36°–38°C. The yield amounted to 64.2 grams (97 percent of theory).

b. Preparation of thioglycolic acid
(HS—$CH_2$—COOH)

64.2 grams (0.39 mol) of the methyl xanthogenic acetic acid, obtained as in (a) of this example, was dissolved in 150 ml. methanol and then neutralized at about 10°C. with a solution of 25 grams (0.39 mol) of potassium hydroxide in 150 ml. methanol. The suspension thus obtained was stirred into a solution of potasssium hydrogen sulfide in methanol, which had been prepared by introducing 14 grams (0.41 mol) of $H_2S$ into a solution of 25 grams (0.39 mol) of KOH in 200 ml. methanol. Thereafter, for the complete splitting of the ester reactant, the reaction mixture was refluxed at its boiling point for 1 hour, and after cooling, the mixture was filtered off under suction, washed a little with methanol and then dried. As the filter residue, there collected the potassium salt of thioglycolic acid in a 99 percent yield (50 grams = 0.385 mol). By suspension in methanol with introduction of gaseous HCl and then filtration of the precipitated potassium chloride there was quantitatively recovered the thioglycolic acid in water-free form (analogous to Example 1).

The foregoing examples establish the relative smoothness and completeness of all of the required reactions, as well as making it apparent that the overall reaction can be accomplished to achieve high yields and practically no sulfur-containing waste products. Variations on these examples using equivalent materials and techniques will be apparent to those skilled in this art. While the invention resides particularly in the reaction of equation (1), it was a substantial technical advance to find an overall process which permits a desirable recycle in a commercial or large scale technical process. The initial materials for this process are readily available in many chemical plants, and the invention offers a very desirable new source for both thioglycolic acid and β-mercaptopropionic acid.

The invention is hereby claimed as follows:

1. A process for the production of thioglycolic acid, β-mercaptopropionic acid or salts thereof, which process comprises:

reacting a hydrogen sulfide of the formula MHS, where M is an alkali or alkaline earth metal, with a xanthogenic acid ester of the formula $$R'O-CS-S(CH_2)_n-COOM',$$

where R' is alkyl of 1 to 5 carbon atoms, $n$ is an integer of 1 or 2 and M' is hydrogen or an alkali or alkaline earth metal, said reaction being carried out at a temperature of approximately 10° to 100°C. in a lower alkanol as the reaction medium.

2. A process as claimed in claim 1 wherein R' is methyl or ethyl.

3. A process as claimed in claim 1 wherein said lower alkanol used as the reaction medium has the formula R'—OH where R' is alkyl of 1 to 5 carbon atoms and both R' radicals of the alkanol and the xanthogenic acid ester are identical to each other.

4. A process as claimed in claim 3 wherein R' of the alkanol and the xanthogenic acid ester is methyl or ethyl.

5. A process as claimed in claim 1 wherein M of said hydrogen sulfide is sodium or potassium.

6. A process as claimed in claim 1 wherein the ester reactant is ethyl xanthogenic acetic acid of the formula

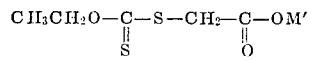

where M' has the same meaning as in claim 1.

7. A process as claimed in claim 1 wherein the ester reactant is ethyl xanthogenic propionic acid of the formula

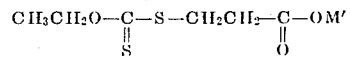

where M' has the same meaning as in claim 1.

8. A process as claimed in claim 1 wherein the reaction is carried out at about the boiling temperature of the reaction medium and for a period of approximately 0.5 to 5 hours.

9. A process as claimed in claim 1 wherein the alkali or alkaline earth metal salt of the thioglycolic acid or β-mercaptopropionic acid is filtered off as a reaction product, and the filtrate containing an alkali or alkaline earth metal salt of xanthogenic acid is recycled after reaction with a haloacid of the formula $$X-(CH_2)_n-COOH$$

where X is chlorine or bromine and $n$ is an integer of 1 or 2, thereby forming said xanthogenic acid ester for reuse in the process.

10. A process as claimed in claim 9 wherein the filtered off alkali or alkaline earth metal salt of thioglycolic acid or β-mercaptopropionic acid is converted into the free acid.

11. A process as claimed in claim 9 wherein the metal M is sodium or potassium, the alkyl group R' is methyl or ethyl and the R' radicals of both the alkanol and the xanthogenic acid ester are identical to each other.

12. A process as claimed in claim 11 wherein the ester reactant is ethyl xanthogenic acetic acid of the formula

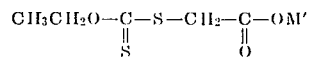

where M' is hydrogen, sodium or potassium.

* * * * *